United States Patent
Sone et al.

(10) Patent No.: US 11,060,918 B2
(45) Date of Patent: Jul. 13, 2021

(54) EVALUATOR, MEASUREMENT APPARATUS, EVALUATING METHOD, AND NON-TRANSITORY RECORDING MEDIUM

(71) Applicants: Takuroh Sone, Kanagawa (JP); Takafumi Hiroi, Tokyo (JP); Takashi Soma, Kanagawa (JP); Shuhei Watanabe, Chiba (JP); Hideyuki Kihara, Kanagawa (JP)

(72) Inventors: Takuroh Sone, Kanagawa (JP); Takafumi Hiroi, Tokyo (JP); Takashi Soma, Kanagawa (JP); Shuhei Watanabe, Chiba (JP); Hideyuki Kihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 16/502,290

(22) Filed: Jul. 3, 2019

(65) Prior Publication Data

US 2020/0018650 A1 Jan. 16, 2020

(30) Foreign Application Priority Data

Jul. 13, 2018 (JP) .............................. JP2018-133476

(51) Int. Cl.
*G01J 3/50* (2006.01)
*G06T 7/136* (2017.01)
(Continued)

(52) U.S. Cl.
CPC .............. *G01J 3/504* (2013.01); *G01J 3/021* (2013.01); *G01J 3/42* (2013.01); *G01N 21/57* (2013.01);
(Continued)

(58) Field of Classification Search
CPC .... G01J 3/504; G01J 3/021; G01J 3/42; G01J 2003/425; G06T 7/136; G06T 7/11; G06T 7/0008; G06T 2207/10024; G01N 21/57
See application file for complete search history.

(56) References Cited

U.S. PATENT DOCUMENTS

| 10,168,215 B2 | 1/2019 | Gotoh et al. | |
| 2002/0063721 A1* | 5/2002 | Masuda | G01J 3/50 |
| | | | 345/600 |

(Continued)

FOREIGN PATENT DOCUMENTS

| JP | 2004-125718 | 4/2004 |
| JP | 2010-243353 | 10/2010 |

(Continued)

OTHER PUBLICATIONS

Extended European Search Report dated Dec. 2, 2019, in Patent Application No. 19184481.0, 7 pages.

(Continued)

*Primary Examiner* — Dominic J Bologna
(74) *Attorney, Agent, or Firm* — Oblon, McClelland, Maier & Neustadt, L.L.P.

(57) ABSTRACT

An evaluating method includes obtaining, by an imaging device, a two-dimensional reflected light amount distribution of a surface of a target; classifying, by one or more processors, the surface into a plurality of areas on the basis of chromaticity information of the two-dimensional reflected light amount distribution; and evaluating, by one or more processors, appearance characteristics of the target on the basis of respective sets of chromaticity information of the areas.

16 Claims, 10 Drawing Sheets

(51) Int. Cl.
*G06T 7/11* (2017.01)
*G01J 3/02* (2006.01)
*G01J 3/42* (2006.01)
*G01N 21/57* (2006.01)
*G06T 7/00* (2017.01)

(52) U.S. Cl.
CPC .............. *G06T 7/0008* (2013.01); *G06T 7/11* (2017.01); *G06T 7/136* (2017.01); *G01J 2003/425* (2013.01); *G06T 2207/10024* (2013.01)

(56) References Cited

U.S. PATENT DOCUMENTS

| | | | | |
|---|---|---|---|---|
| 2002/0163640 | A1* | 11/2002 | Masuda | G01J 3/46 356/402 |
| 2010/0284610 | A1* | 11/2010 | Yoshikawa | G06T 7/0012 382/164 |
| 2015/0070694 | A1* | 3/2015 | Fan | G01J 3/50 356/319 |
| 2017/0270655 | A1 | 9/2017 | Watanabe et al. | |
| 2018/0184967 | A1* | 7/2018 | Yoshida | G06T 7/0012 |
| 2019/0195624 | A1* | 6/2019 | Kato | G01J 3/36 |

FOREIGN PATENT DOCUMENTS

| | | |
|---|---|---|
| JP | 2012-173272 | 9/2012 |
| JP | 2016-6416 A | 1/2016 |
| JP | 2017-173300 | 9/2017 |
| JP | 2018-004509 | 1/2018 |
| JP | 2018-009987 | 1/2018 |
| JP | 2018-009988 | 1/2018 |
| JP | 2018-151165 | 9/2018 |

OTHER PUBLICATIONS

Zhou, R. et al., "Early Detection and Continuous Quantization of Plant Disease Using Template Matching and Support Vector Machine Algorithms", 2013 First International Symposium on Computing and Networking, XP055645017, Dec. 1, 2013, pp. 300-304.

Bulanon, D. M. et al., "Development of a Real-time Machine Vision System for the Apple Harvesting Robot", SICE 2004 Annual Conference, XP010824634, vol. 1, Aug. 4, 2004, pp. 595-598.

* cited by examiner

P

EVALUATOR, MEASUREMENT APPARATUS, EVALUATING METHOD, AND NON-TRANSITORY RECORDING MEDIUM

BACKGROUND OF THE INVENTION

1. Field of the Invention

The present invention relates to an evaluator, a measurement apparatus, an evaluating method, and a non-transitory recording medium.

2. Description of the Related Art

Recently, a paint, where a glittering material, such as aluminum flakes or mica flakes, is mixed for providing high quality impression of a home electric appliance or the like, is known. Such a type of paint has a glittering appearance unique to a glittering material. Concerning such a paint containing a glittering material, in order to evaluate a glittering effect, in the related art, color measurement information is measured from a paint-coated surface; and a glittering effect is converted to numeral values as particle characteristics to be evaluated (see, e.g., Japanese Patent Application Laid-Open No. 2018-009988 and Japanese Patent Application Laid-Open No. 2004-125718).

SUMMARY OF THE INVENTION

According to one aspect of the present invention, an evaluating method includes obtaining, by an imaging device, a two-dimensional reflected light amount distribution of a surface of a target; classifying, by one or more processors, the surface into a plurality of areas on the basis of chromaticity information of the two-dimensional reflected light amount distribution; and evaluating, by one or more processors, appearance characteristics of the target on the basis of respective sets of chromaticity information of the areas.

Other objects, features, and advantages of the present invention will become more apparent from the following detailed description when read in conjunction with the accompanying drawings.

DETAILED DESCRIPTION OF THE EMBODIMENTS

In a method for obtaining composition information of a coating film from color measurement information of a coated surface of a target as in an evaluating method of the related art, the color of the base surface of the coating film and the glittering caused by the glittering particles are measured together. Therefore, depending on the type of the coating material and the type of the glittering material, the results may be completely different between the appearance texture and the evaluation value, and it is difficult to improve the search accuracy for the composition information.

Embodiments of the present invention have been devised in view of the above-described problem, and have an object to provide an evaluating method for accurately measuring color characteristics of a target by separately evaluating a base color and a particle color of a glittering-material-containing coating film.

In order to achieve the object, an evaluating method of an embodiment includes obtaining a two-dimensional reflected light amount distribution of a surface of a target; classifying the surface into a plurality of areas on the basis of chromaticity information of the two-dimensional reflected light amount distribution; and evaluating appearance characteristics of the target on the basis of respective sets of the chromaticity information of the areas.

According to the evaluating method of the embodiment, it is possible to accurately measure color characteristics of the target by separately evaluating the base color and the particle color of the glittering-material-containing coating film.

Figure 1:
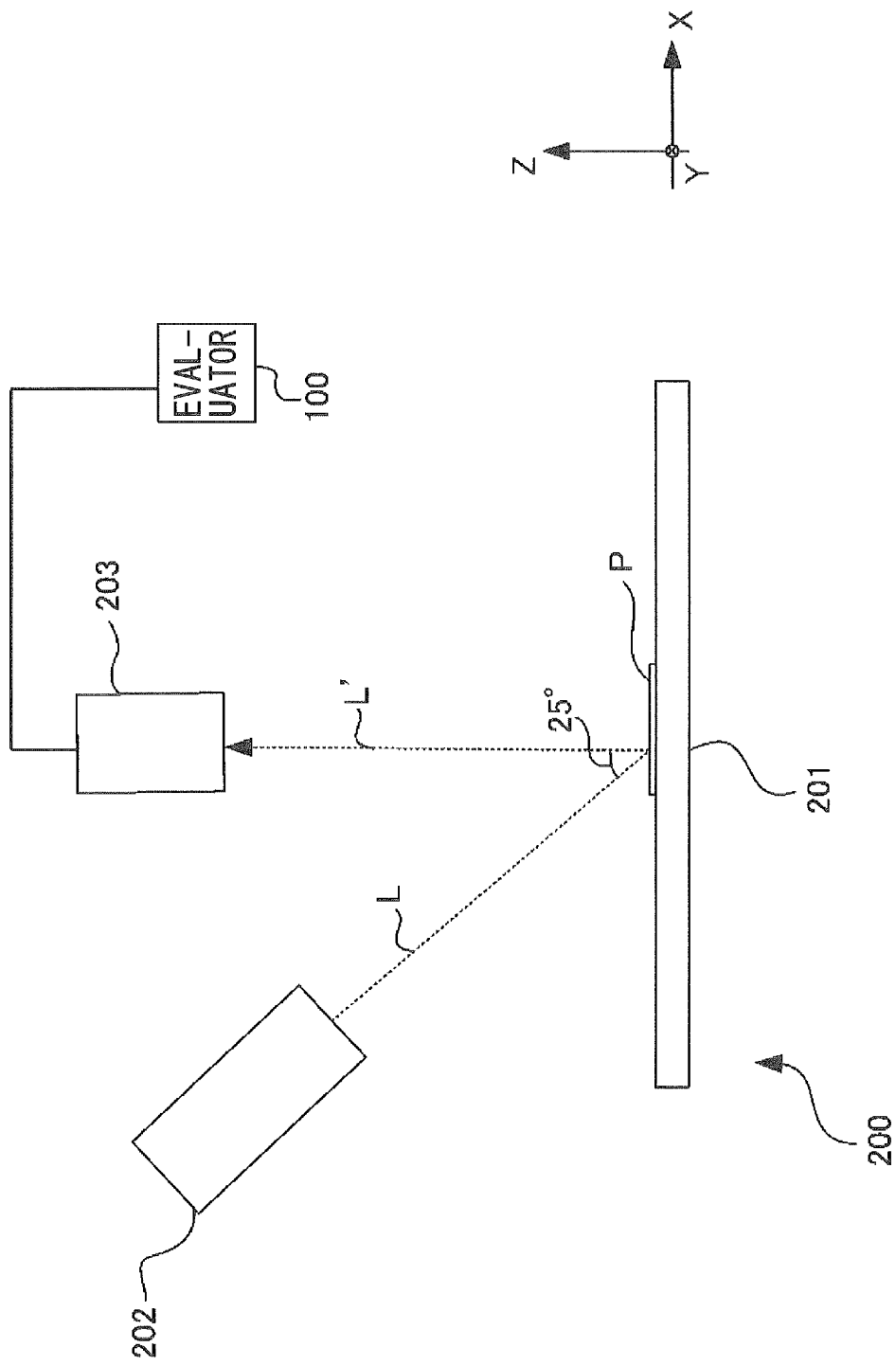
FIG. 1 illustrates an example of an overall configuration of a measurement system according to an embodiment of the present invention.

As an example of an embodiment of the present invention, FIG. 1 illustrates a schematic configuration of a measurement system 200 as a measurement apparatus for evaluating particle characteristics.

The measurement system 200 includes a holder 201 on which a sample P as a target to measure particle characteristics is placed; a light source 202 as an illuminator for emitting light L to the sample P; and a camera device 203 as an imaging device that receives reflected light L' from the sample P and obtains a two-dimensional reflected light amount distribution as an image.

The measurement system 200 further includes an evaluator 100 for quantitatively evaluating particle characteristics of the surface of the sample P, i.e., quantitatively evaluating glittering appearance characteristics unique to a glittering material, on the basis of the two-dimensional reflected light amount distribution of the sample P captured by the camera device 203.

For simplicity, the following description assumes that, as illustrated in FIG. 1, the vertical upward direction is set to a +Z direction; the depth direction included in the plane perpendicular to the +Z direction is set to a +Y direction; the right direction included in the same plane is set to a +X direction. The sample P is a plate-like member placed on and in parallel to the X-Y plane on the holder 201; a coating film 301 is formed as a coated surface S on the top side of the sample P (see FIG. 4A).

The light source 202 employs a white LED (Light-Emitting Diode) according to the present embodiment.

The camera device 203 is a common RGB (Red, Green, and Blue) camera. In this regard, it is also possible to instead use a method of measuring a two-dimensional reflected light amount distribution using a line sensor. The camera device 203 employs a lens to adjust a magnification so that one pixel has a size smaller than or equal to 20 µm in a range of 512 pixels by 512 pixels. The camera device 203 measures the surface state of the sample P and captures a two-dimensional reflected light amount distribution as an image.

The camera device 203 is not limited to the above-described configuration and may be a multi-spectral camera or a spectral camera capable of capturing a two-dimensional reflected light amount distribution with a plurality of wavelengths. Also the resolution is not limited to the above-mentioned resolution. In this regard, because widely used glittering materials have sizes of approximately 20 µm, a resolution finer than or equal to approximately 20 µm per pixel is desirable to accurately measure particles.

Figure 2:
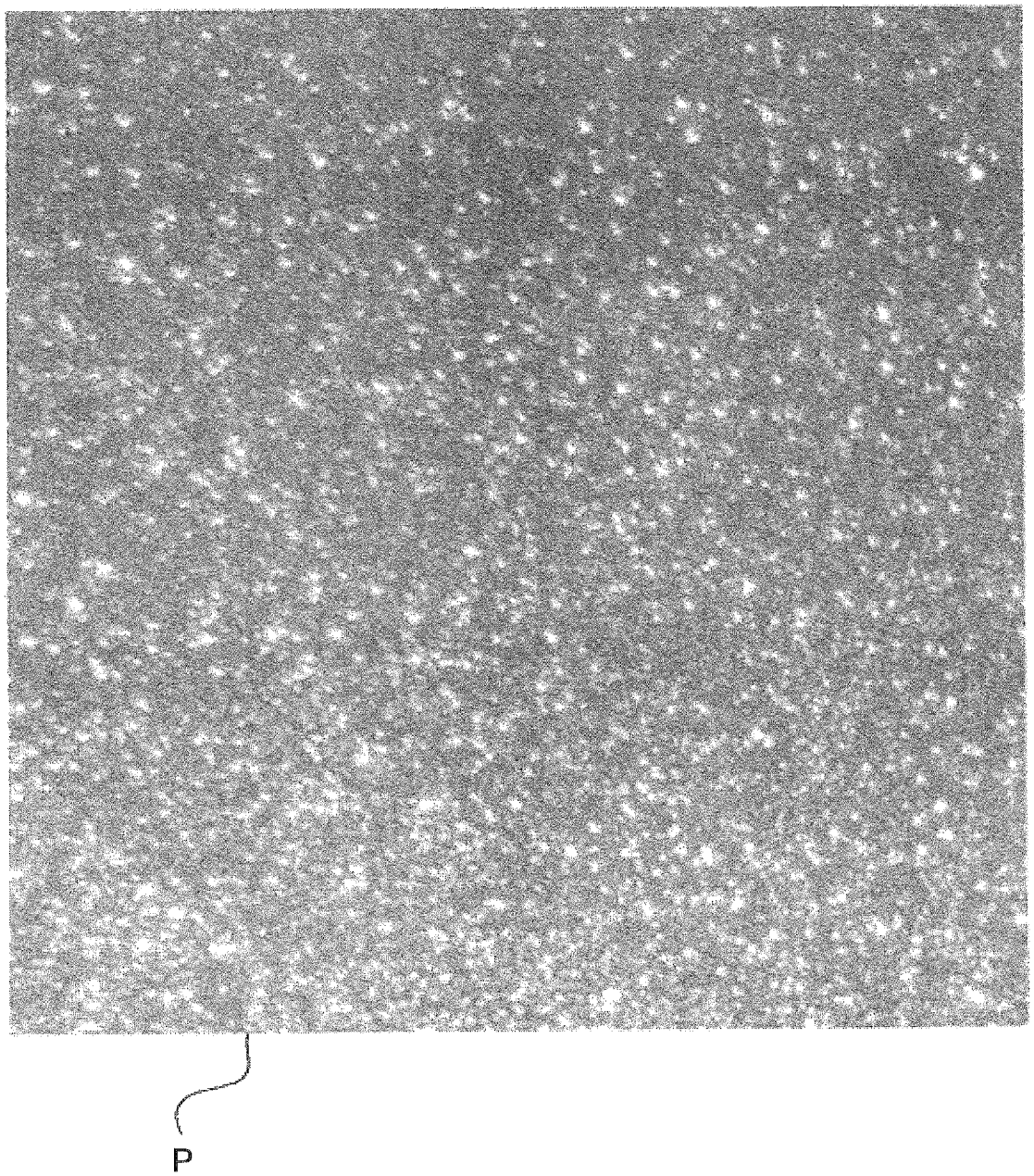
FIG. 2 illustrates an example of an image captured by an imaging device illustrated in FIG. 1.

According to the present embodiment, a two-dimensional reflected light amount distribution is an RGB image measured by the camera device 203 as illustrated in FIG. 2. In FIG. 2, for the purpose of making it possible to be easily identifiable, an image of a two-dimensional reflected light amount distribution is illustrated on a gray scale where areas having high lightness, i.e., areas where granular glittering materials reflect light, are illustrated as being white; areas of the other coating materials are illustrated as being black or gray. However, actually, the image of the two-dimensional reflected light amount distribution is a color image where pixels have respective colors.

Figure 3:
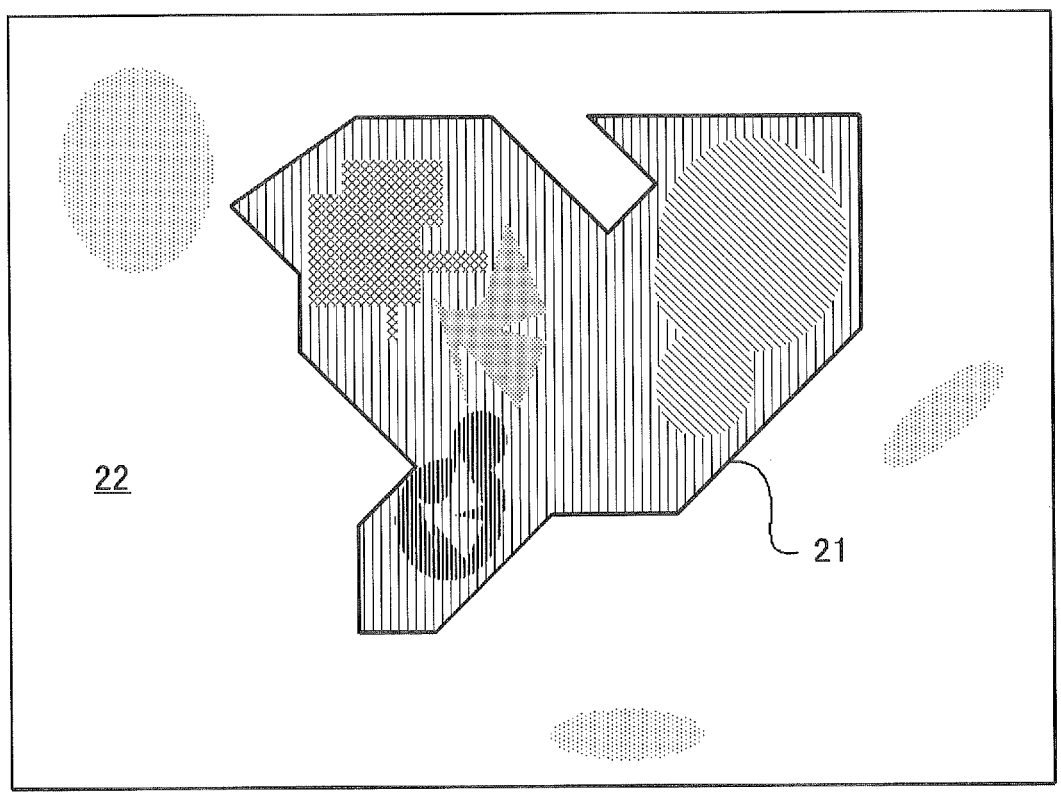
FIG. 3 schematically illustrates the image illustrated in FIG. 2.

Such a measured RGB image generally has granularity; by schematically magnifying glittering material areas, as illustrated in FIG. 3, the image is classified into a base area 22 where influence of the base coating materials is greater and a particle area 21 where influence of the glittering materials is greater. In this regard, the particle area 21 includes more than one color and includes respective areas of a plurality of different colors in a mixed manner.

The camera device 203 and the light source 202 are rotatably installed on the holder 201 so that the angles of the camera device 203 and the light source 202 can be freely changed: it is possible to implement measurement at angles of the camera device 203 and the light source 202 depending on an actual position of the sample P such that particle characteristics can be most emphasized.

Figure 4A:
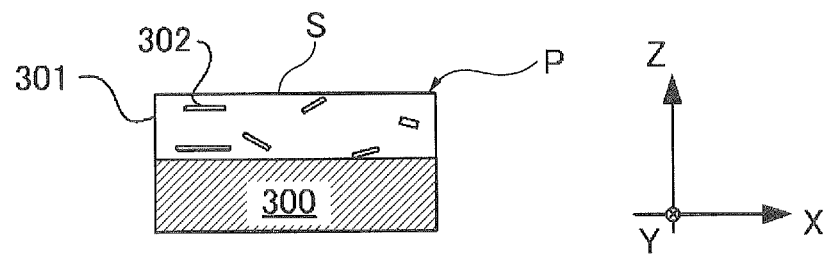
FIGS. 4A and 4B schematically illustrate the image illustrated in FIG. 2.
Figure 4B:
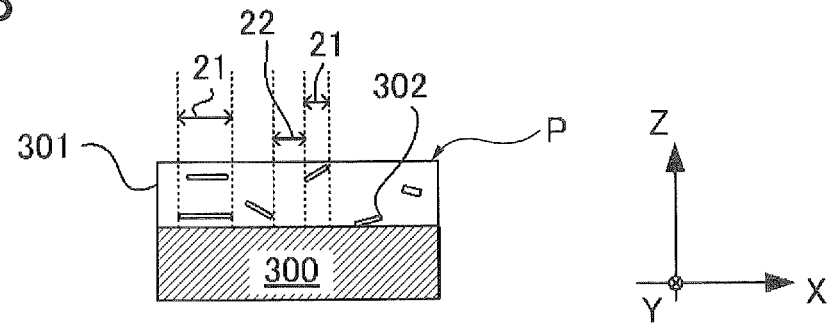

The sample P is a plate-like member with a coating film 301 containing the glittering materials at least on the +Z-direction side of a base material section 300. The coating film 301 of the sample P includes the glittering materials 302 that easily reflect light, such as aluminum flakes; differences in color between the base area 22 and the particle area 21 illustrated in FIGS. 2 and 3 occur due to various factors such as the actual positions, sizes, and inclined angles of the glittering materials 302, as illustrated in FIGS. 4A and 4B.

For measurement, the sample P is placed parallel to the XY plane according to the present embodiment; the angle of incidence of emitted light L falls within the range of 10° to 25°; and the camera device 203 is installed at the angle of 0° (see FIG. 1). In this regard, the angle of incidence of emitted light L and the angle at which the camera device 203 is installed are not limited. It is also possible to capture an image of a two-dimensional reflected light amount distribution of the sample P a plurality of times where the above-mentioned angles are changed each time.

Figure 5A:
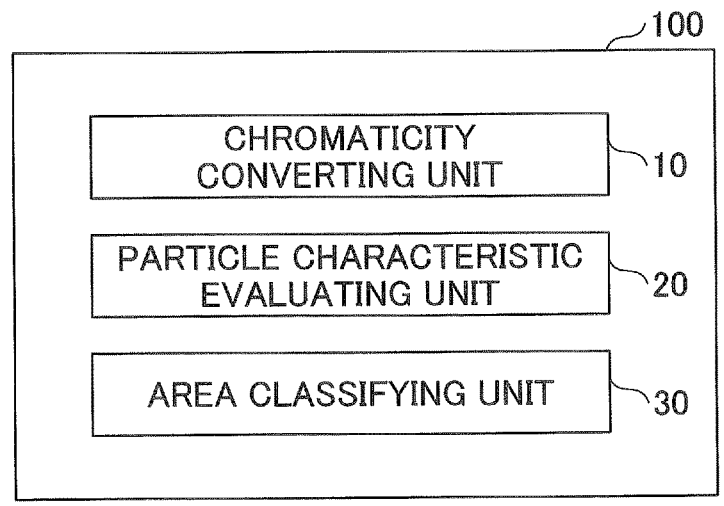
FIGS. 5A and 5B are block diagrams of an example of a configuration of an evaluator illustrated in FIG. 1.

As illustrated in FIG. 5A, the evaluator 100 includes a chromaticity converting unit 10 configured to convert a RGB image obtained by the camera device 203 to chromaticity information; a particle characteristic evaluating unit 20 configured to evaluate appearance characteristics of a target on the basis of the chromaticity information obtained by the chromaticity converting unit 10; and an area classifying unit 30 configured to classify the area indicated by the RGB image into a particle area 21 including glittering materials and a base area 22 not including glittering materials on the basis of the chromaticity information obtained by the chromaticity converting unit 10.

The chromaticity converting unit 10 converts the obtained RGB image to an image of the L*a*b* color system, as will be described later with reference to FIG. 6. Although the L*a*b* color system is used for "chromaticity information" according to the present embodiment, an embodiment is not limited to such a configuration. "Chromaticity information" means, for example, two-dimensional color information of an image obtained by the camera device 203, such as RGB values or L*a*b* values, and may include three stimulus values XYZ or information of other colors such as CMYK.

The chromaticity converting unit 10 has a function as an image obtaining unit to obtain an RGB image using the camera device 203, and also has a function to obtain chromaticity information (in particular, according to the present embodiment, color information including L*a*b* values) on the basis of such an RGB image.

The area classifying unit 30 has a function to classify the coated surface S into two areas, i.e., the base area 22 and the particle area 21, on the basis of the chromaticity information of the two-dimensional reflected light amount distribution.

Specifically, after the RGB image is converted to the image of the L*a*b* color system by the chromaticity converting unit 10, the area classifying unit 30 uses the lightness L* information representing the lightness of the measured image to determine the pixels having the lightness greater than or equal to a predetermined reference value L* as the pixels of the particle area 21 and determine the pixels having the lightness smaller than the reference value L* as the pixels of the base area 22, from among the pixels of the measured image.

The particle characteristic evaluating unit 20 evaluates the appearance characteristics of the coated surface S by converting the chromaticity information of the base area 22 and the chromaticity information of the particle area 21 to numerical values as evaluation values. According to the present embodiment, the sample P has the coated surface S and therefore the term "coated surface" is used. However, what the particle characteristic evaluating unit 20 evaluates is not limited to appearance characteristics of such a coated surface and may be appearance characteristics of a surface of a target other than a coated surface.

As described above, the evaluator 100 executes the steps of: obtaining a two-dimensional reflected light amount distribution of an RGB image or the like, using an external camera or the camera device 203 of the present embodiment; classifying a coated surface S into a base area 22 and a particle area 21 on the basis of the chromaticity information of the RGB image; and evaluating the appearance characteristics of the coated surface S on the basis of the chromaticity information of the base area 22 and the chromaticity information of the particle area 21.

Figure 5B:
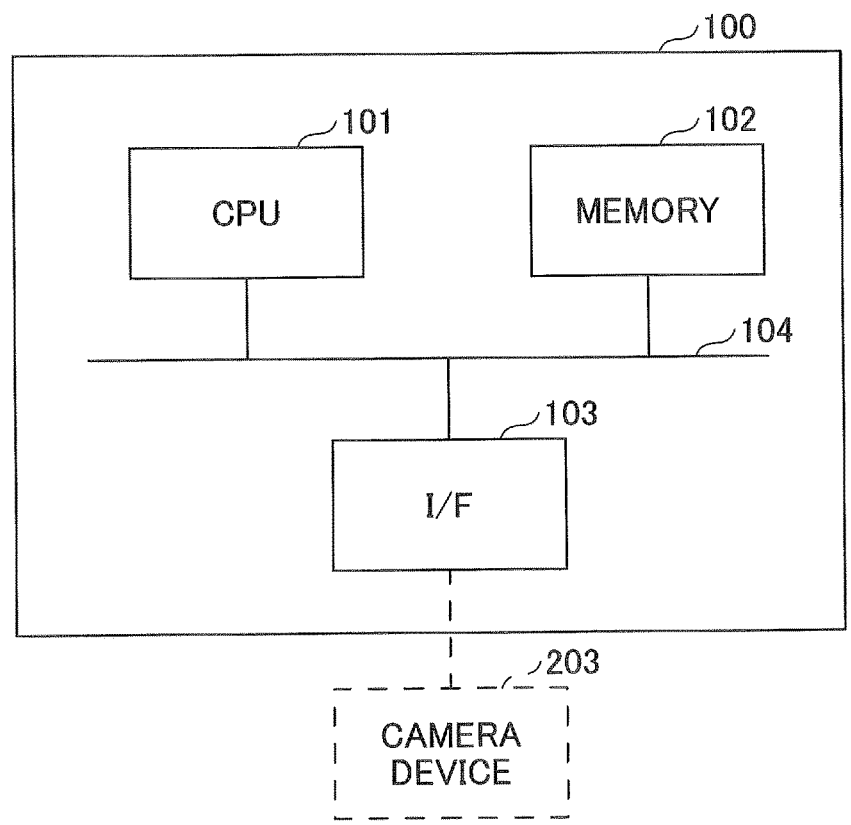

In this regard, as illustrated in FIG. 5B, the evaluator 100 may be an information processing apparatus, such as a personal computer, including a CPU (Central Processing Unit) 101, a memory 102, and an interface (I/F) 103; these elements are connected with each other and are thus configured to send and receive information among these elements. The memory 102 may include, for example, a RAM (Random Access memory), a ROM (Read-Only Memory), a hard disk drive, a CD-ROM drive, and so forth. The chromaticity converting unit 10, the particle characteristic evaluating unit 20, and the area classifying unit 30 may be implemented as a result of the CPU 101 executing one or more programs stored by the memory 102 using data stored by the memory 102. The CPU 101 receives data of an RGB image from the camera device 203 through the interface 103.

The method for evaluating the particle characteristics of the coated surface S of the sample P using the evaluator 100 having the above-described configuration will now be described using the flow chart of FIG. 6.

First, in step S101, the relationship between the light source 202 and the camera device 203 is adjusted so that emitted light L from the light source 202 is incident on the camera device 203 after being reflected by a white plate Q, not illustrated in FIG. 1, placed on the holder 201; this state is referred to as an initial state. In the initial state, an image of the white plate Q is first captured by the camera device 203; the white plate Q is a standard sample for calibration (step S102).

An image of the white plate Q is captured for calibration to correct unevenness of illumination or the like, if any; the white plate Q may be a white ceramic or a white diffuser panel well known as an optical component. At this time, it is desirable to adjust an exposure time of the camera device 203 so that no pixel of the camera device 203 saturates and to record the exposure time.

Next, the sample P is placed on the holder 201 (the white plate Q having been removed), and an image of the sample P is captured using the camera device 203 in the same manner as in step S102 (step S103). Step S103 is a step to obtain a two-dimensional reflected light amount distribution of the coated surface S, i.e., the surface, viewed from the +Z direction, of the sample P as the target. At this time, it is desirable that the exposure time of the camera device 203 is adjusted so that no pixel of the camera device 203 saturates and is recorded, as in step S102.

Because of the high reflectance of the glittering materials, image capture with a single exposure time may cause the dynamic range of the camera device 203 to be exceeded. In order to avoid such a situation, a plurality of RGB images may be captured with a plurality of exposure times, respectively.

Such a plurality of RGB images may be used in such a manner that, for the pixel components for which saturation has occurred with a single exposure time, the same pixels extracted from another RGB image are used to combine with the other pixels to obtain an image with an increased dynamic range in such a pseudo manner. In such a case, as illustrated in step S104, a selecting step may be inserted to determine whether to capture images with a plurality of exposure times.

In step S105, the chromaticity converting unit 10 normalizes the pixel values of the RGB image obtained in step S103 by dividing the pixel values by the corresponding pixel values of the RGB image of the standard sample Q obtained in step S102. In a case where the exposure time differs between capturing the sample P and capturing the standard sample Q, it is desirable to correct the difference by multiplying the measured values of the sample P by the ratio of the exposure times.

In step S106, the chromaticity converting unit 10 converts the RGB data of each pixel of the RGB image to L*a*b* data. In this regard, a commonly known RGB→XYZ conversion formula is used to convert each pixel represented by RGB to 3-stimulus values X, Y, and Z first. Specifically, a RGB→XYZ conversion formula prescribed in ITU-R BT.709 is used. The chromaticity converting unit 10 then converts the 3-stimulus values X, Y, and Z to L*a*b* data using a XYZ→L*a*b* conversion formula.

The XYZ→L*a*b* conversion formula is, for example, Formula 1 below prescribed by the International Illumination Commission (CIE) using, for example three stimulus values Xn, Yn, and Zn with a perfect reflecting diffuser.

$$L^* = 116(Y/Yn)^{1/3} - 16$$

$$a^* = 500[(X/Xn)^{1/3} - (Y/Yn)^{1/3}]$$

$$b^* = 200[(Y/Yn)^{1/3} - (Z/Zn)^{1/3}] \quad \text{Formula 1}$$

Through such a chromaticity converting step, it is possible to obtain the lightness L* image, the a* image, and the b* image from the RGB image after obtaining the 3-stimulus values X, Y, and Z. As described above, the chromaticity converting unit 10 calculates the L*, a*, and b* components of the L*a*b* color system from the 3-stimulus value X, Y, and Z in step S106. Thus, step S106 is a chromaticity converting step of converting the two-dimensional reflectance distribution into chromaticity information.

Next, in step S107, the area classifying unit 30 calculates the lightness average L*ave by summing the lightness of all pixels of the lightness L* image and dividing the summing result by the total number of pixels (note: "average" refers to mean value). In step S108, the area classifying unit 30 uses the lightness average L*ave calculated in step S107 as a threshold value to determine the pixels of the lightness L* image having the lightness greater than or equal to the threshold value as the pixels of the particle area 21 having the glittering materials and to determine the pixels of the lightness L* image having the lightness smaller than the threshold value as the pixels of the base area 22 not including glittering materials (step S108). Step S108 is a classifying step of classifying the obtained two-dimensional reflected light amount distribution into a plurality of areas.

Figure 7A:
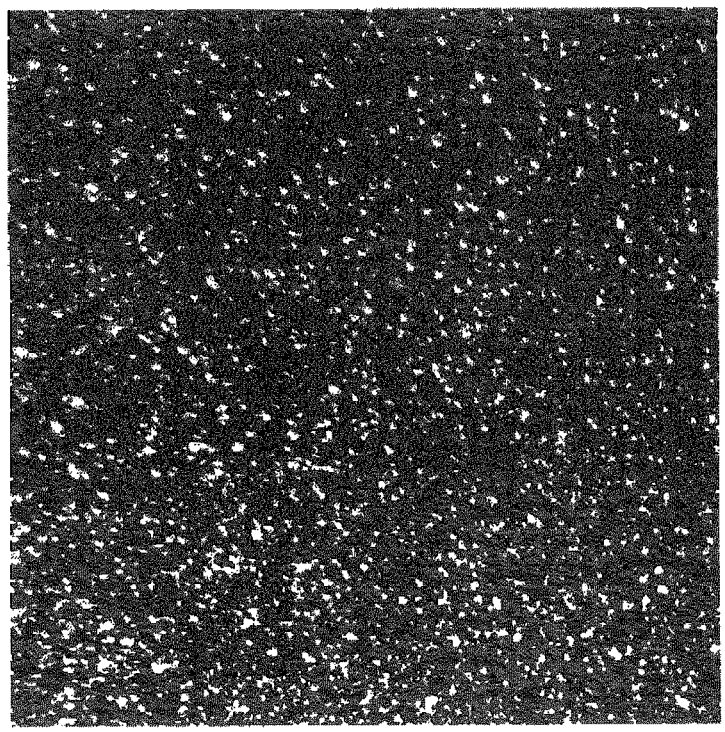
FIGS. 7A, 7B and 7C illustrate an example of a measurement result of a sample according to the embodiment.
Figure 7B:
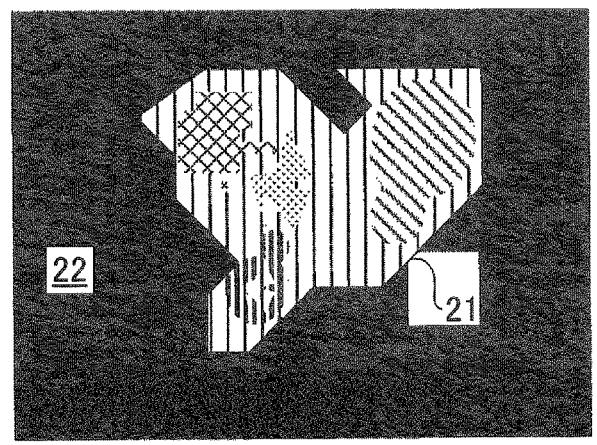

Then, the area classifying unit 30 may extract only the chromaticity information of the pixels that have been determined as belonging to the particle area 21 to identifiably express an image of the particle area 21, as illustrated in FIGS. 7A and 7B in step S109. In FIG. 7B, in the image illustrated in FIG. 2, the chromaticity of the particle area 21 in which the lightness L* is greater than or equal to the threshold value is left unchanged; the base area 22 is caused to be expressed by a black color. Thus, in FIG. 7B, the image of the particle area 21 extracted in step S109 is expressed in a simulated manner. In the expressed white area of FIG. 7B, the chromaticity information (the L*a*b* values) of the particle area 21 is left unchanged.

Figure 7C:
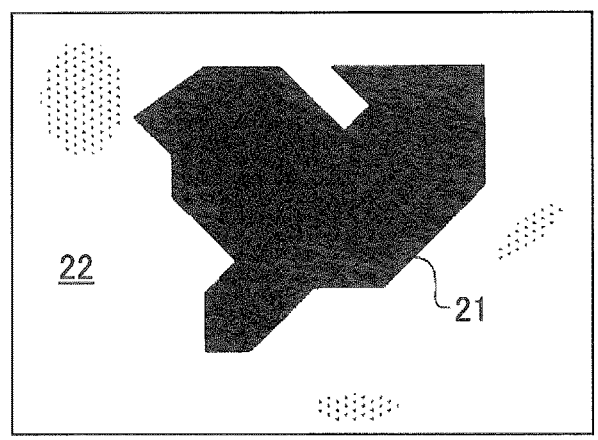

It is also possible to separately generate an image where only the base area 22 is expressed. In this case, in a way similar to the case of FIGS. 7A and 7B, the particle area 21 is caused to be expressed by a black color and the chromaticity information of the base area 22 is left unchanged as illustrated in FIG. 7C.

Next, a calculation method for evaluation values will be described. In step S110, the particle characteristic evaluating unit 20 extracts the respective areas corresponding to the particle area 21 from the L* image, the a* image, and the b* image obtained in step S106, and calculates the average of the L* values, the average of the a* values, and the average of the b* values (i.e., respective mean values) for the particle area 21 using the thus extracted pixel values and the numbers of pixels (step S110). In the same way, in step S111, the particle characteristic evaluating unit 20 extracts the respective areas corresponding to the base area 22 from the L* image, the a* image, and the b* image obtained in step S106, and calculates the respective averages of the L* values, the a* values, and the b* values for the base area 22 using the thus extracted pixel values and the numbers of pixels.

As in steps S110 and S111, the particle characteristic evaluating unit 20 thus separately calculates the corresponding sets of the L*a*b* values for the particle area 21 and the base area 22 and calculates the corresponding averages. By thus calculating the averages, the different evaluation values can be obtained for the particle area 21 and the base area 22, respectively. Thus, steps S110 and S111 are evaluating steps according to the present embodiment.

Thus, the case where the averages (i.e., mean values) of the L*a*b* values are used as evaluation values has been described. However, an embodiment is not limited to such a configuration, and any values as most appropriate for evaluating the state of the coated surface may be used, such as median values or mode values. However, according to the detailed investigation by the inventors, mean values are used here because evaluation values obtained by using mean values are well balanced with actual experimental results.

Next, advantageous effects of classifying a surface of a target into areas on the basis of an obtained two-dimensional reflected light amount distribution and calculating evaluation values for classified areas will now be described.

Figure 8A:
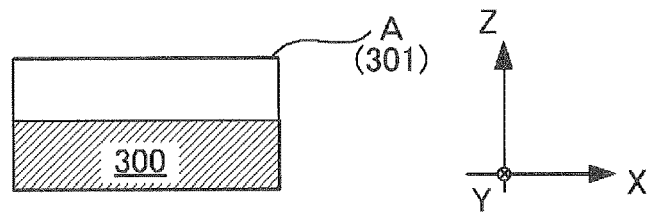
FIGS. 8A and 8B illustrate examples of schematic configurations of a coating film A and a coating film B as samples concerning the embodiment.
Figure 8B:
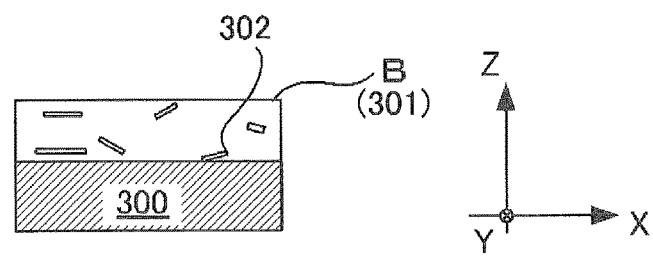

First, as illustrated in FIGS. 8A and 8B, a coating film A (301), which is a solid white coating film without a glittering material 302 and a coating film B (301), which is a silver metallic coating film, which contains 30% of a glittering material 302 of aluminum flakes in a color paint, are prepared using the same white color paint. The coating film A and the coating film B use the same color paint and only differ as to whether the glittering material is used. Therefore, it is advantageous, concerning calculating of evaluation values, to be able to find, using the evaluation values, the coating film A that uses the same color paint as the color paint of the coating film B, for, for example, restoring the coating film B.

In this regard, for example, for human eyes, the coating film A appears white, whereas the coating film B, which contains the glittering material, has a glittering appearance and thus, differs in visual impression.

Table 1 below illustrates L*a*b* values of a measurement result obtained from measuring the coating film A and the coating film B using a conventional colorimeter as a comparative example using the present embodiment.

In the comparative example, the color measurement condition was such that the evaluator 100 of the measurement system 200 illustrated in FIG. 1 was replaced with a conventional colorimeter 100', and the angle of light incidence was 45° and the light reception angle was 30°.

Because the description of the comparative example is duplicated with the description of the above-described first embodiment, the description of the configuration of the comparative example will be omitted.

TABLE 1

| | glittering material contained | color measurement results | | |
| --- | --- | --- | --- | --- |
| | | L* | a* | b* |
| coating film A (301) | 0% | 90.44 | 0.27 | 1.64 |

TABLE 1-continued

| | glittering material contained | color measurement results | | |
| --- | --- | --- | --- | --- |
| | | L* | a* | b* |
| coating film B (301) | 30% | 114.2 | 1.65 | 16.43 |

As can be seen from Table 1, there is a clear difference in the L*, a*, and b* values between the coating film A and the coating film B, and the corresponding distance in the color space calculated from the L*a*b* values is ΔE=28.02.

Thus, it can be seen that when a conventional colorimeter is used, even if the same paint is used, the color measurement results differ greatly depending only on whether a glittering material is used.

In this regard, in the measurement system 200 according to the present embodiment, results of measuring the coating film A and the coating film B identical to those in Table 1 are illustrated in Table 2. The result illustrated in Table 2 illustrates evaluation results on the base area 22 from among the RGB images captured by the camera device 203 as described above with reference to step S111.

TABLE 2

| | glittering material contained | color measurement result | | |
| --- | --- | --- | --- | --- |
| | | L* | a* | b* |
| coating film A (301) | 0% | 94.1 | −0.11 | 0 |
| coating film B (301) | 30% | 93.27 | 0.59 | 6.51 |

As can be seen from Table 2, the respective L*a*b* values of L*, a*, and b* have the distance ΔE=6.60 in the color space and are very similar between the coating film A and the coating film B through evaluation using the base area 22. As described above, it is obvious that the coating film A and the base areas 22 of the coating film B are very similar as a result of using the measurement system 200 of the present embodiment.

Such a result is due to extremely high lightness at areas (pixels) having pieces of a glittering material in a coating film containing the glittering material, as already illustrated in FIG. 2. That is, it is considered that, as a result of simply calculating evaluation values on the basis of obtained image data without classifying a coated surface S into a base area 22 and a particle area 21 as in the above-mentioned case of using the conventional colorimeter, the value of L* at areas having pieces of the glittering material is very large. Therefore, the average includes not only color information but also large influence of a L* component that remains through the averaging process.

In this regard, by calculating evaluation values separately after classifying a coated surface S into a base area 22 and a particle area 21 as in the embodiment, it is possible to obtain color information of only the base area 22 and also color information of only the particle area 21, so that the color characteristics of the coated surface S can be accurately measured.

Further, by using a* values and b* values for obtaining color evaluation values and using L* values not having a color factor for classifying an area by the area classifying unit 30, because L* values are most responsive to a glittering material 302 and do not have a color factor, it is possible to implement more accurate color measurement of a coated surface.

According to the present embodiment, a base area 22 and a particle area 21 are classified with the use of a lightness average L*ave as a threshold value. However, an embodiment is not limited to such a configuration, and it is also possible to use another configuration as long as using chromaticity information that can be obtained from an RGB image.

For example, average L*a*b* values of an image may be calculated; then, the color difference between the L*a*b* values and the average L*a*b* values of each pixel may be calculated; and then, a pixel having such a color difference, for example, greater than or equal to 10 is determined as belonging to a particle area 21, and a pixel having a color difference smaller than 10 is determined as belonging to a base area 22. By using such a method of classifying on the basis of color difference, even when a glittering material such as pearl particles having lightness lower than lightness of aluminum flakes is used, it is possible to accurately measure the color characteristics of a coated surface with better accuracy.

As the camera device 203 according to the present embodiment, an XYZ camera, a multispectral camera, a hyperspectral camera, or the like may be used instead of an RGB camera. Further alternatively, a monochrome camera may be used and a color illuminator of three or more colors may be used to capture a plurality of images for the respective colors.

Concerning a RGB camera with a Bayer array, it is known that false colors are generated depending on a demosaicing method applied. In this regard, by implementing spectroscopy thus using a monochrome camera as a light receiving unit and using a color illuminator as an illuminator, it is possible to avoid generation of false colors and it is possible to improve color measurement accuracy.

According to the present embodiment, the evaluator 100 uses the area classifying unit 30 that obtains a two-dimensional reflected light amount distribution of a coated surface using the camera device 203 and classifies the coated surface into a plurality of areas using the chromaticity information of the two-dimensional reflected light amount distribution; and the particle characteristic evaluating unit 20 that evaluates the appearance characteristics of the coated surface on the basis of the respective sets of chromaticity information of the plurality of areas. The evaluator 100 thus evaluates the chromaticity information of the coated surface. With such a configuration, it is possible to accurately measure the color characteristics of even a coated surface of a coating film that uses glittering materials.

According to the present embodiment, the particle characteristic evaluating unit 20 evaluates the appearance characteristics of the coated surface using the averages of the chromaticity information for each of a particle area 21 and a base area 22. With such a configuration, it is possible to accurately measure color characteristics of even a coated surface of a coating film that uses glittering materials. In particular, if the lightness average L*ave is used from among the chromaticity information, the color characteristics of the coated surface can be evaluated more accurately.

Figure 6:
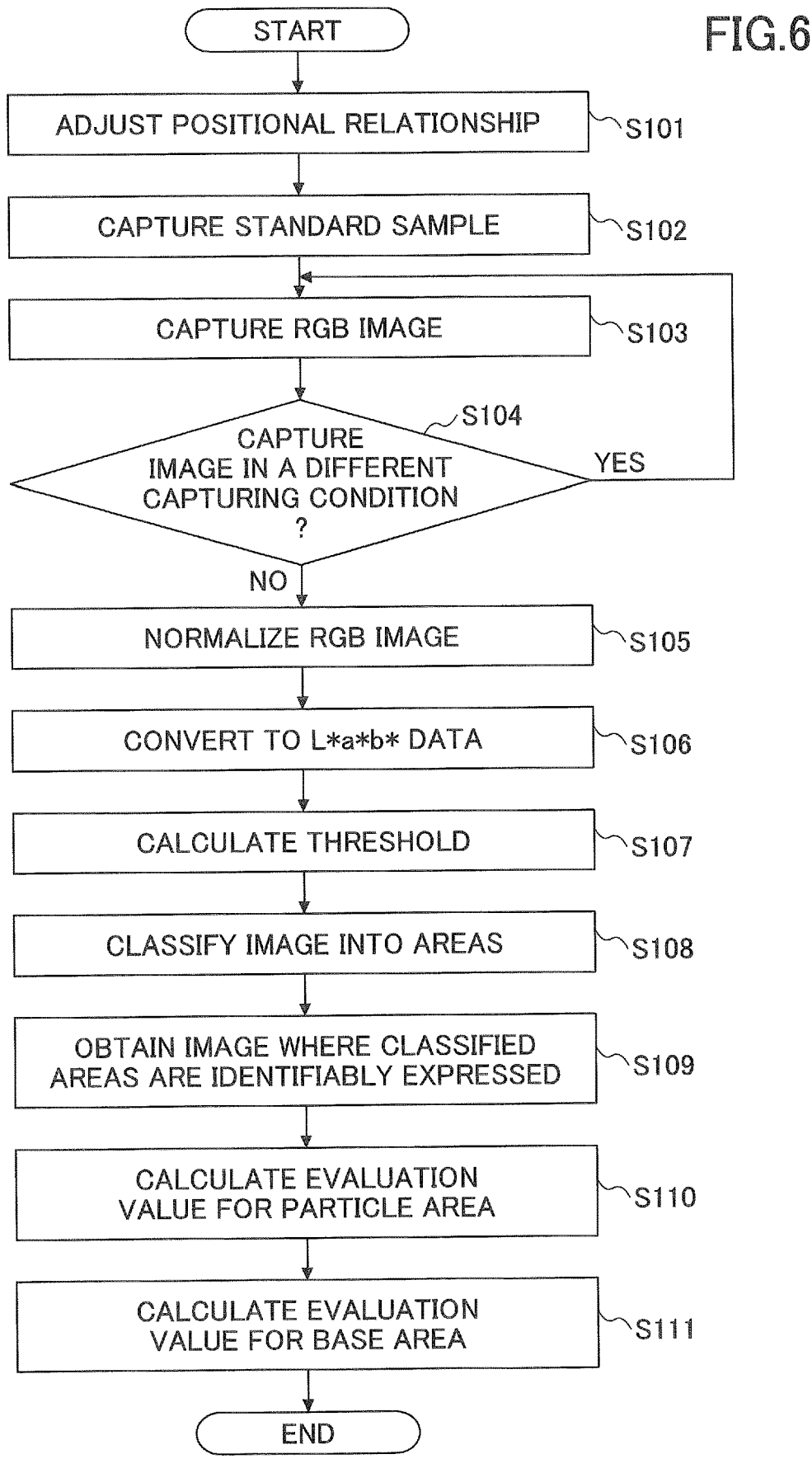
FIG. 6 is a flowchart illustrating an example of operations of the evaluator according to the embodiment.

According to the present embodiment, as in step S108 of FIG. 6, a threshold of chromaticity information is set for a two-dimensional reflected light amount distribution, and the area classifying unit 30 determines that a pixel having chromaticity information greater than or equal to the threshold belongs to a particle area 21 and determines that a pixel having chromaticity information smaller than the threshold belongs to a base area 22. According to such a configuration, because the areas classified by the area classifying unit 30 are classified according to whether a glittering material 302 is contained, color evaluation can be implemented for the area containing glittering material 302 and the area not containing glittering material 302 separately. Thus, it is possible to accurately evaluate the color characteristics of the coated surface.

The above-mentioned threshold is not limited to the threshold described above. The threshold may include a plurality of thresholds.

For example, a particle area extraction threshold and a base area extraction threshold may be separately set for the chromaticity information of a two-dimensional reflectance distribution; a pixel having the chromaticity information greater than or equal to the particle area extraction threshold may be determined as belonging to a particle area and a pixel having the chromaticity information smaller than the base area extraction threshold may be determined as belonging to a base area. According to such a configuration, the classification between the particle area 21 and the base area 22 is improved to improve the accuracy to identify the chromaticity information for each area, so that the color characteristics of the coated surface can be evaluated more accurately.

According to the present embodiment, as chromaticity information, at least one of L*, a*, b*, c*, and h of the L*a*b* color system is used. According to such a configuration, it is possible to implement quantitative evaluation of difference in color of the coated surface S of the sample P.

In the present embodiment, the measurement system 200 includes the illuminating unit that emits light to a coated surface; the camera device 203 that receives reflected light with one or more exposure times to measure a two-dimensional reflected light amount distribution; and the evaluator 100 that evaluates the color characteristics of the coated surface. According to such a configuration, it is possible to accurately measure color characteristics of even a coated surface of a coating film that uses glittering materials.

Further, in the present embodiment, as illustrated in FIG. 6, the evaluator 100 executes an obtaining step S103 to obtain a two-dimensional reflected light amount distribution of a coated surface, a classifying step S108 to classify the coated surface into a plurality of areas on the basis of the chromaticity information of the two-dimensional reflected light amount distribution, and evaluating steps S110 and S111 to evaluate the appearance characteristics of the coated surface on the basis of the respective sets of chromaticity information of the plurality of areas.

Next, as a second embodiment of the present invention, a color evaluation of a coating film containing mica pearl will be described. When aluminum flakes are used as a glittering material, the reflectivity tends to be high and the lightness tends to be high, so that the chromaticity is not strongly recognized by human eyes. However, it is known that, when a coating film uses mica pearl as a glittering material, coloring at a particle area 21 tends to be strongly perceived when viewed by a person.

In view of this point, an object of the second embodiment is to implement more accurate color evaluation of a coated surface by evaluating a change in degree of coloring depending on the material of a glittering material. A case of comparing a coating film C containing mica pearl and a coating film D containing different mica pearl will now be described.

In the second embodiment, the main configuration of the measurement system 200 is the same as that described concerning the first embodiment. Therefore, unless otherwise needed, the same reference numerals are given and the corresponding description is omitted.

Figure 9:
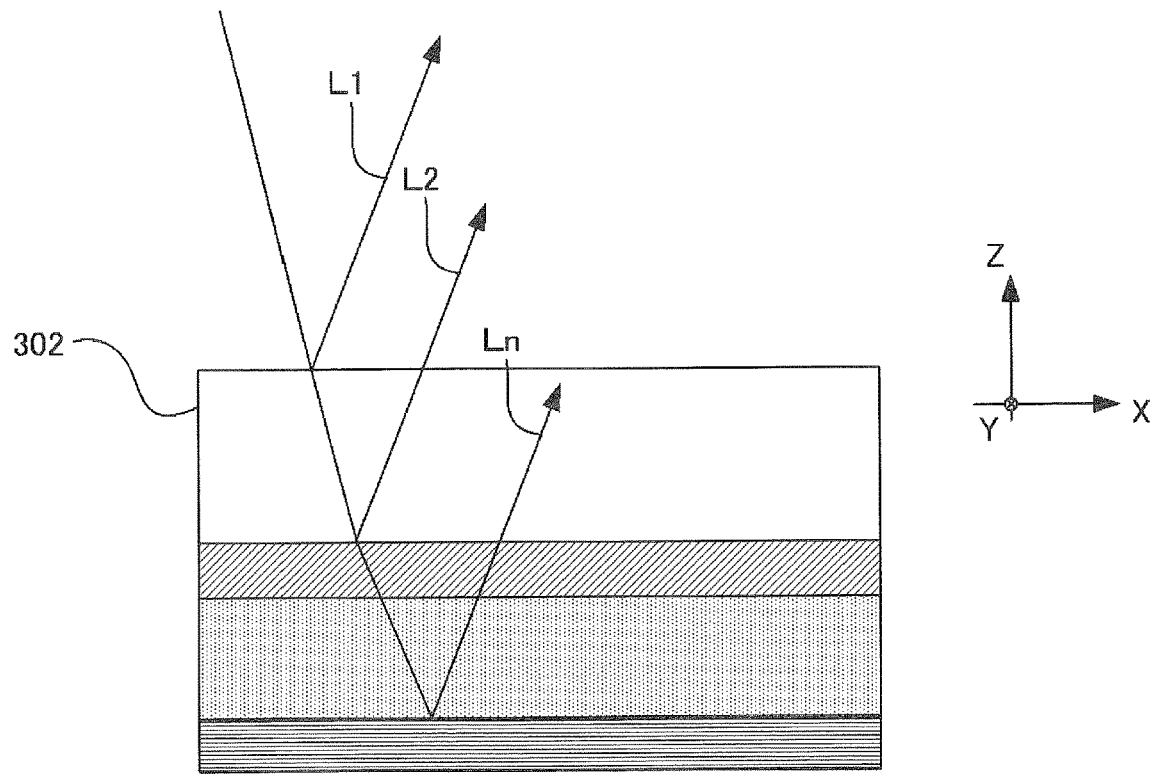
FIG. 9 illustrates an example of a schematic configuration of a sample concerning a second embodiment of the present invention.

Mica pearl is a glittering material and has a layer structure having transparent oxide films of different refractive indexes on a surface of a mica or $SiO_2$. Therefore, as illustrated in FIG. 9, primary reflected light L1 reflected from the surface and secondary reflected light L2 and Ln reflected from an internal oxide film and reflected between layers interfere so that specific wavelengths are intensified by each other resulting in a colored appearance.

The coloring may vary depending on the layer structure of the mica pearl, the angle of incident light, and the thicknesses of the oxide films, so that some types of mica pearl may have strong coloring and some types of mica pearl may have weak coloring. In this regard, it has been difficult to calculate evaluation values taking into account materials of mica pearl and so forth.

Figure 12:
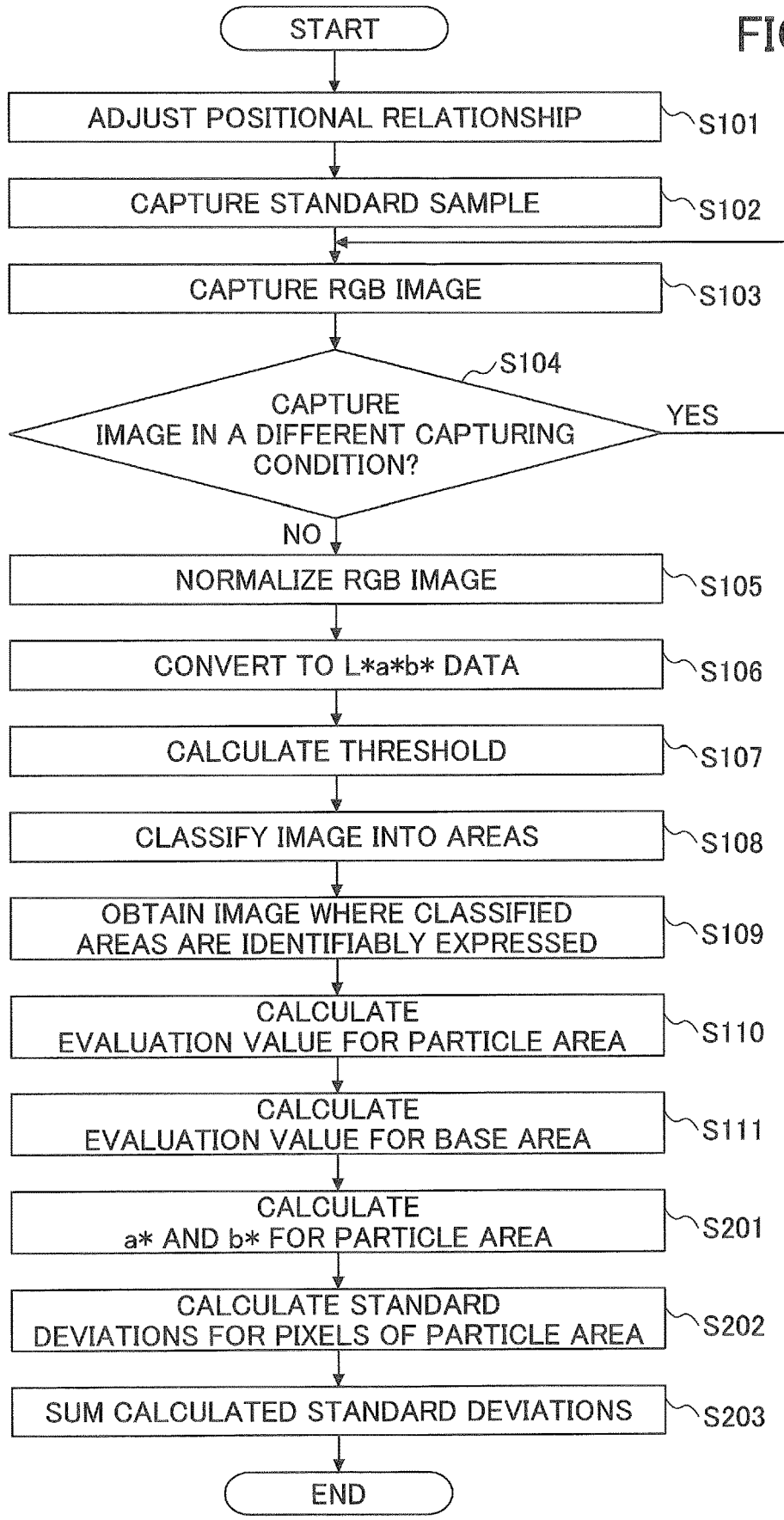
FIG. 12 is a flowchart illustrating an example of operations of a measurement system according to the second embodiment.

In the second embodiment, according to the flowchart illustrated in FIG. 6, color evaluation values is calculated for each of a base area 22 and a particle area 21 of a sample P in steps S110 and S111 (as illustrated in FIG. 12).

Figure 10:
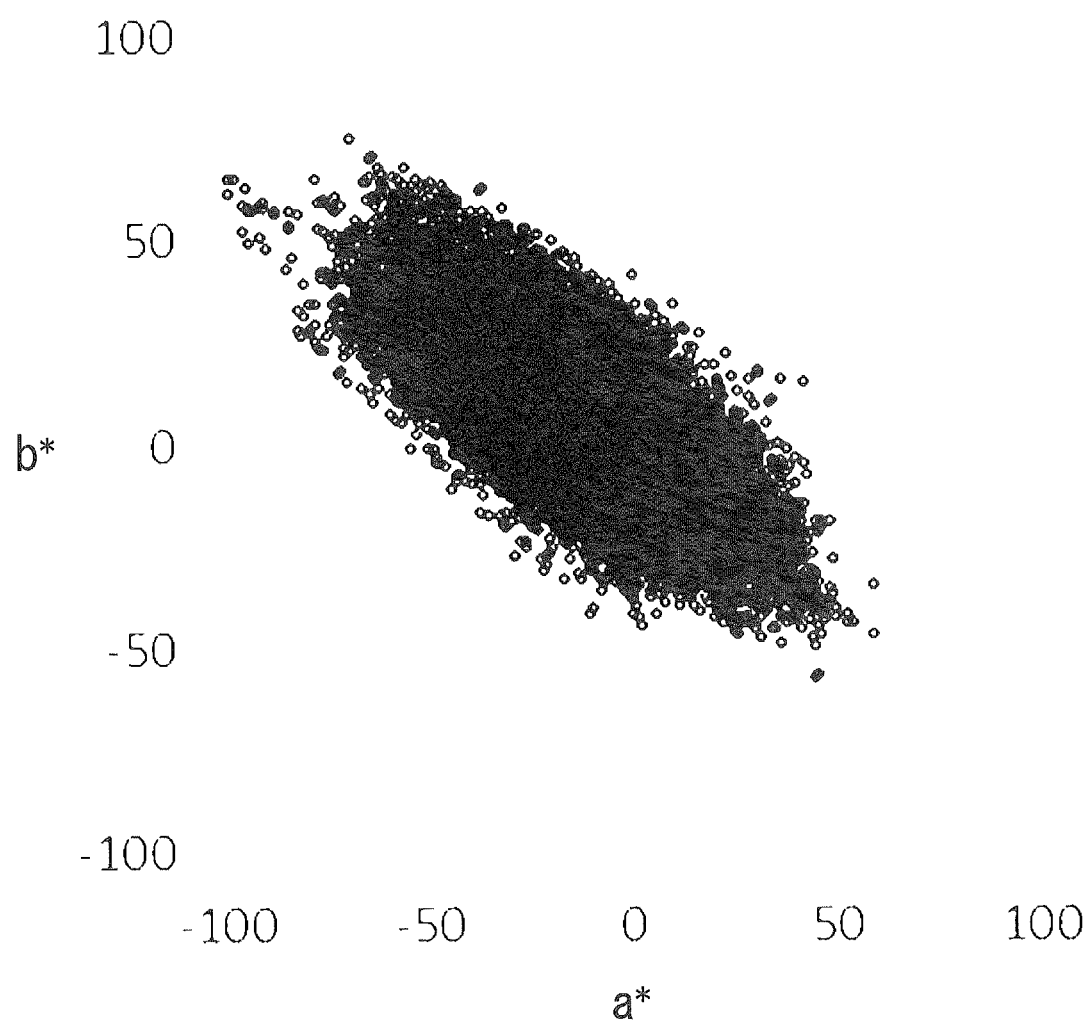
FIG. 10 illustrates an example of an evaluation result for a coating film C according to the second embodiment.

Further in the second embodiment, with the use of a a* image and a b* image of a particle area 21, combinations of all the a* values and the b* values from among the L*a*b* values of the respective pixels of the particle area 21 are plotted where the ordinate axis corresponds to b* and the abscissa axis corresponds to a* as illustrated in FIG. 10 (step S201 of FIG. 12).

Next, the respective standard deviations are calculated for the a* values and the b* values from among the L*a*b* values of the respective pixels of the particle area 21 (step S202).

Finally, in step S203, the particle characteristic evaluating unit 20 sums the standard deviation of the a* values and the standard deviation of the b* values calculated in step S202 and the thus obtained sum value will be used as an evaluation value for evaluating the degree of coloring by the particles.

Figure 11:
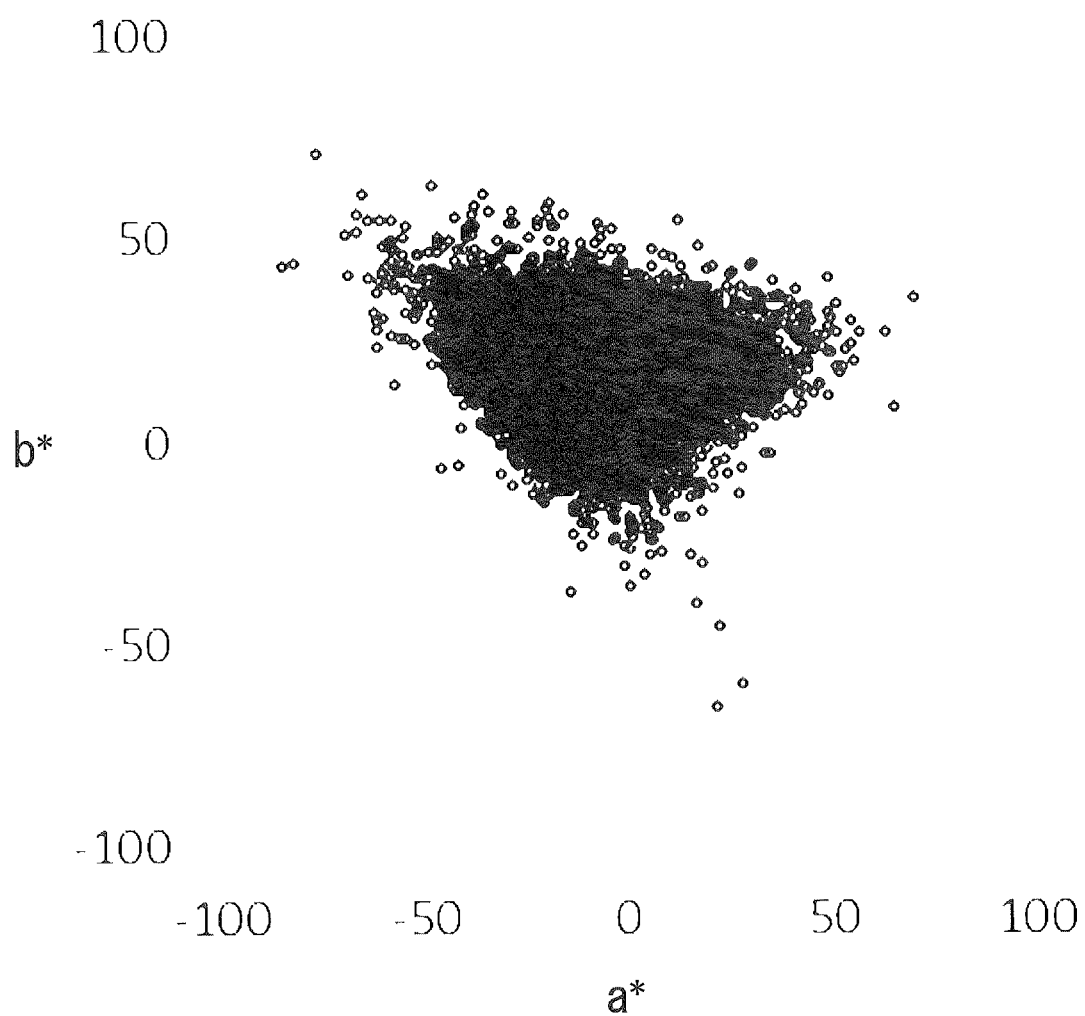
FIG. 11 illustrates an example of an evaluation result for a coating film D according to the second embodiment.

Step S201 described above is executed again after the coating film C in the sample P is replaced with the coating film D; FIG. 11 illustrates the result of plotting in step S201.

From among L*a*b* values, the L* values are indexes substantially for only the degree of lightness not taking into account colors, and the a* values and the b* values represent colors. In this regard, from comparison between FIGS. 10 and 11, it can be considered that, because the a* values and the b* values of the particle area 21 differ between the coating film C and the coating film D, the respective degrees of coloring perceived by a person who views the coating film C and the coating film D differ between the coating film C and the coating film D.

For example, it can be seen that the data of the coating film D illustrated in FIG. 11 has the smaller variation of the a* values and the b* values than the variation of the a* values and the b* values of the coating film C illustrated in FIG. 10. In other words, it can be considered that the glittering material contained in the coating film D has less coherence.

Thus, from FIGS. 10 and 11 plotted in step S201, the degrees of coloring by the glittering materials used in the coating films can be evaluated. Further, it is possible to determine the degrees of coherence of glittering materials, the types of glittering materials, and so forth from the degrees of coloring.

Specifically, the standard deviation of the a* values and the standard deviation of the b* values are calculated from the combinations of the a* values and the b* values calculated in step S201, and are summed. The particle characteristic evaluating unit 20 uses the calculated standard deviation as an evaluation value indicating the degree of variation of the a* values and the b* values, that is, the degree of coloring. For example, the evaluation value for the coating film C illustrated in FIG. 10 is 26.46; the evaluation value for the coating film D illustrated in FIG. 11 is 16.37. According to such a method, a degree of coloring of a glittering material included in a coating film can be evaluated by the particle characteristic evaluating unit 20 from the standard deviations of a* values and b* values.

It is desirable that a color of a coated surface be appropriately evaluated in accordance with a difference in color that is actually perceived by human eyes. However, it is known that very strong light tends to make it difficult for human eyes to sense color because the sensitivity to color is saturated accordingly. In this regard, concerning L*a*b* values, the a* values and the b* values plotted in step S201 of FIG. 12 correspond to the pixels including both the pixels having high L* values and the pixels having low L* values indistinguishably.

Accordingly, in the present embodiment, the area classifying unit 30 may further classify the particle area 21 and exclude the pixels having the L* values greater than a predetermined high brightness threshold value L*high=100, as the pixels of a high brightness area, from the pixels to be used in calculating the a* values and the b* values. According to such a configuration, the area classifying unit 30 includes a function as a excluding unit to calculate an excluding threshold value for excluding the pixels of the unwanted area of the particle area 21 from the chromaticity information; the high brightness threshold L*high corresponds to the excluding threshold value.

As described above, the area classifying unit 30 selects pixels, in accordance with a function of human eyes, to be used for calculating an evaluation value, to limit chromaticity information to be provided to and used by the particle property evaluating section 20 to calculate an evaluation value. Concerning the above-described embodiments, a* values and b* values have been mentioned; in this regard, it is also possible to use c* values representing saturation or h values representing hue.

In the two embodiments described above, for simplicity, the configuration of converting a RGB image to L*a*b* data is described; however, embodiments are not limited to such a configuration. For example, evaluation may be implemented using 3-stimulus value XYZ, even if pixels of a RGB image are used. For example, if components of RGB are used for lightness L*, it is considered desirable to use a G component because a G component is most easily perceived by human eyes.

However, in order to calculate evaluation values thus using R, G, and B values, it is desirable to take into account a fact that R, G, and B values have respective color factors compared to a case where lightness L* is used. For example, when the area classifying unit 30 classifies a base area 22 and a particle area 21 using G values, it is desirable that, in steps S110 and S111, evaluation values be calculated using R values, G values, and B values. It is also possible to use a method to provide an offset by subtracting the averages of the RGB components of the image of a base area 22 obtained in step S108 from the RGB components of each pixel of a particle area 21.

By thus using an index other than lightness L* for classifying a particle area 21 and a base area 22, the chromaticity converting unit 10 can be omitted. However, it then becomes difficult to index each value to be used for evaluation. Therefore, it is most desirable that the area classifying unit 30 uses lightness L* to classify the area of a coated surface.

Although the evaluators, measurement apparatuses, evaluating methods, and non-transitory recording media have been described by the embodiments, the present invention is not limited to such specific embodiments, and various modifications and changes may be made without departing from the spirit of the invention as set forth in the appended claims, unless otherwise specified in the foregoing description.

For example, in the present embodiments, the measurement system includes an imaging device and an RGB image is captured by the imaging device. However, it is also possible that an image from which a two-dimensional reflected light amount distribution can be obtained is transmitted from outside of the measurement system.

Concerning the present embodiments, the case where particle characteristic evaluation is performed from a single two-dimensional reflected light amount distribution has been described. In this regard, a plurality of two-dimensional reflected light amount distributions may be used for particle characteristic evaluation.

The embodiments implemented by the measurement system 200 have been described. In this regard, the evaluating methods implemented by the measurement system 200 may be implemented by a program executing the above-described functional units; the program may be stored by a non-transitory recording medium.

The advantageous effects described above concerning the embodiments are the most desirable advantageous effects resulting from the embodiments, and advantageous effects of the present invention are not limited to these advantageous effects.

The present application is based on and claims priority under 35 U.S.C. § 119 to Japanese Patent Application No. 2018-133476, filed Jul. 13, 2018, the contents of which are incorporated herein by reference in their entirety.

What is claimed is:

1. An evaluating method, comprising:
    obtaining, by an imaging device including an image sensor, a two-dimensional reflected light amount distribution of a surface of a target, the light amount distribution including multiple chromaticity components;
    classifying, by processing circuitry, the surface into a plurality of areas based on a first subset of the chromaticity components of the two-dimensional reflected light amount distribution; and
    evaluating, by the processing circuitry, appearance characteristics of the target by calculating, for each particular area of the classified plurality of areas, an evaluation value using only the chromaticity components corresponding to the particular area, wherein the calculating step includes calculating the evaluation value using a second subset of the chromaticity components, the second subset to the chromaticity components being different from the first subset of the chromaticity components.

2. The evaluating method according to claim 1, wherein the evaluating step includes evaluating the appearance characteristics of the target using an average of chromaticity information obtained from the second subset of the chromaticity components for each of the plurality of areas.

3. The evaluating method according to claim 1, further comprising
    setting a threshold value for chromaticity information of the two-dimensional reflected light amount distribution,
    wherein the classifying step includes determining that when particular chromaticity information of a pixel is greater than or equal to the threshold value, the pixel belongs to a particle area, and when the particular chromaticity information of the pixel is smaller than the threshold value, the pixel belongs to a base area.

4. The evaluating method according to claim 3, further comprising
    evaluating, by the processing circuitry, a degree of coloring at the particle area based on the second subset of the chromaticity components corresponding to the particle area.

5. The evaluating method according to claim 3, wherein the evaluating step includes calculating an excluding threshold value for the chromaticity information of the two-dimensional reflected light amount distribution, and evaluating coloring at the particle area after excluding pixels having certain chromaticity information greater than or equal to the excluding threshold value.

6. The evaluating method according to claim 1, further comprising
    setting a particle area extraction threshold value and a base area extraction threshold value for chromaticity information of the two-dimensional reflected light amount distribution,
    wherein the classifying step includes determining that when particular chromaticity information of a pixel is greater than or equal to the particle area extraction threshold value, the pixel belongs to a particle area and when the particular chromaticity information of the pixel is smaller than the base area extraction threshold value, the pixel belongs to a base area.

7. The evaluating method according to claim 1, wherein the multiple chromaticity components include L*, a*, b*, c*, and h of a L*a*b* color system.

8. The evaluating method according to claim 7, wherein the evaluating step includes summing a standard deviation of a* values and a standard deviation of b* values from among the second subset of chromaticity components corresponding to each area of the plurality of areas, and evaluating coloring in the area using a summing result.

9. The evaluating method of claim 7, wherein the first subset of components includes the L* component, and the second subset of components excludes the L* component.

10. The evaluating method of claim 7, wherein the first set of components consists of the L* component, and the second set of components consists of the a* and b* components.

11. The evaluating method of claim 1, wherein the classifying step further comprises classifying the surface into a particle area including glittering materials and a base area that does not include glittering materials.

12. An evaluator, comprising:
    processing circuitry configured to
        obtain a two-dimensional reflected light amount distribution of a surface of a target, the light amount distribution including multiple chromaticity components;
        classify the surface of the target into a plurality of areas based on a first subset of the chromaticity components of the two-dimensional reflected light amount distribution of the surface of the target; and evaluate appearance characteristics of the target by calculating, for each particular area of the classified plurality of areas, an evaluation value using only the chromaticity components corresponding to the particular area, wherein the processing circuitry is further configured to calculate the evaluation value using a second subset of the chromaticity components, the second subset of the chromaticity components being different from the first subset of the chromaticity components.

13. A measurement system, comprising:

the evaluator according to claim 12;

an illuminator configured to emit light to the surface of the target; and an imaging device, including an image sensor, configured to receive the light reflected by the surface with one or a plurality of exposure times to measure the two-dimensional reflected light amount distribution.

14. The evaluator of claim 12, wherein the processing circuitry is further configured to classify the surface into a particle area including glittering materials and a base area that does not include glittering materials.

15. A non-transitory recording medium storing therein a program, which when executed by processing circuitry causes the processing circuitry to perform a method, comprising:

obtaining a two-dimensional reflected light amount distribution of a surface of a target, the light amount distribution including multiple chromaticity components;

classifying the surface of the target into a plurality of areas based on a first subset of the chromaticity components of the two-dimensional reflected light amount distribution of the surface of the target; and evaluating appearance characteristics of the target by calculating, for each particular area of the classified plurality of areas, an evaluation value using only the chromaticity components corresponding to the particular area, wherein the calculating step includes calculating the evaluation value using a second subset of the chromaticity components, the second subset of the chromaticity components being different from the first subset of the chromaticity components.

16. The non-transitory recording medium of claim 15, wherein the classifying step further comprises classifying the surface into a particle area including glittering materials and a base area that does not include glittering materials.

* * * * *